Ronald Holt, Battle Creek, Mich.

United States Patent

[15] 3,659,398
[45] May 2, 1972

Holt

[54] FILM FEED AND CUTTER FOR FOLD-OVER WRAPPING MACHINE

[72] Inventor: Ronald Holt, Battle Creek, Mich.
[73] Assignee: Battle Creek Packaging Machines, Inc., Battle Creek, Mich.
[22] Filed: Nov. 2, 1970
[21] Appl. No.: 86,075

[52] U.S. Cl....................................53/389, 83/313, 83/324
[51] Int. Cl.........................................B65b 41/12
[58] Field of Search................53/66, 209, 389; 83/313, 324, 83/38

[56] References Cited

UNITED STATES PATENTS

| | | | |
|---|---|---|---|
| R26,689 | 10/1969 | Holt | 53/209 |
| 2,625,779 | 1/1953 | Peterson | 53/389 |
| 2,982,077 | 5/1961 | Smith | 53/389 |
| 3,332,301 | 7/1967 | Popp et al. | 83/313 |

Primary Examiner—Robert L. Spruill
Attorney—Austin A. Webb

[57] ABSTRACT

A wrapping machine has an article feeding conveyor delivering to a wrapping conveyor driven at the same speed and having a fold-over bar arranged to fold the trailing end of a wrapper sheet forwardly over the article as the article continues to advance. A film feed conveyor delivers the leading end of a wrapper film to the inlet end of the wrapper conveyor to be trapped under and advanced with the article. A rotary cutter bar located at the inlet end of the film feeding conveyor cuts an individual wrapper from the film as the leading end of the wrapper is trapped by the article. Drive connections to the film feed wrapper and the cutter bar and continuously operating film feed rollers operate the film feed and cutter at a slow speed approximating the lineal speed of the wrapping conveyor while the cutter is operating and then speed up the film feed to a fast speed to advance a sufficient length of the film to provide a complete wrapper before the next actuation of the cutter bar.

The drive to the cutter bar operates the bar at a peripheral speed that is slightly greater than the slow lineal speed of the film feed to prevent the film from piling up behind the cutter.

10 Claims, 5 Drawing Figures

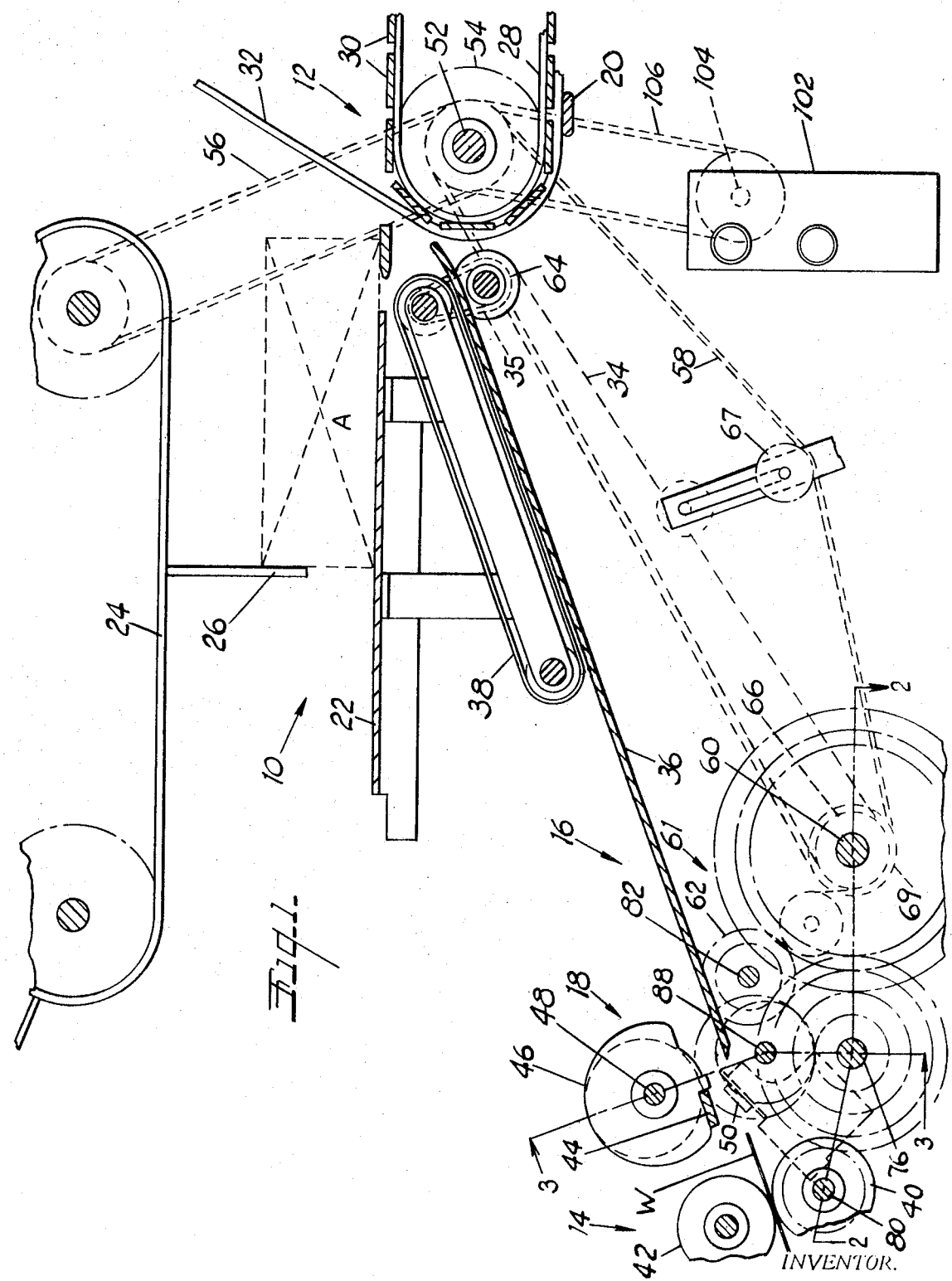

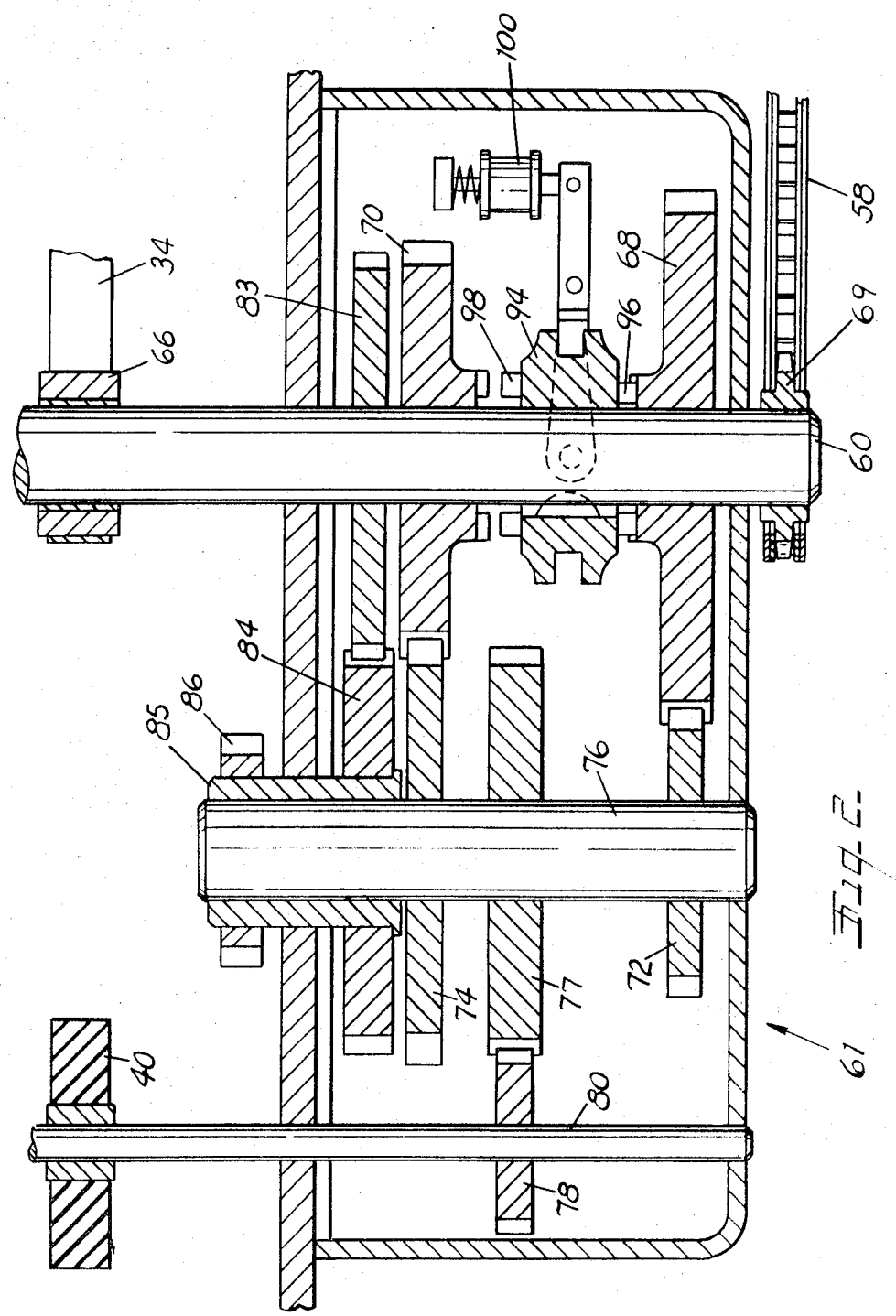

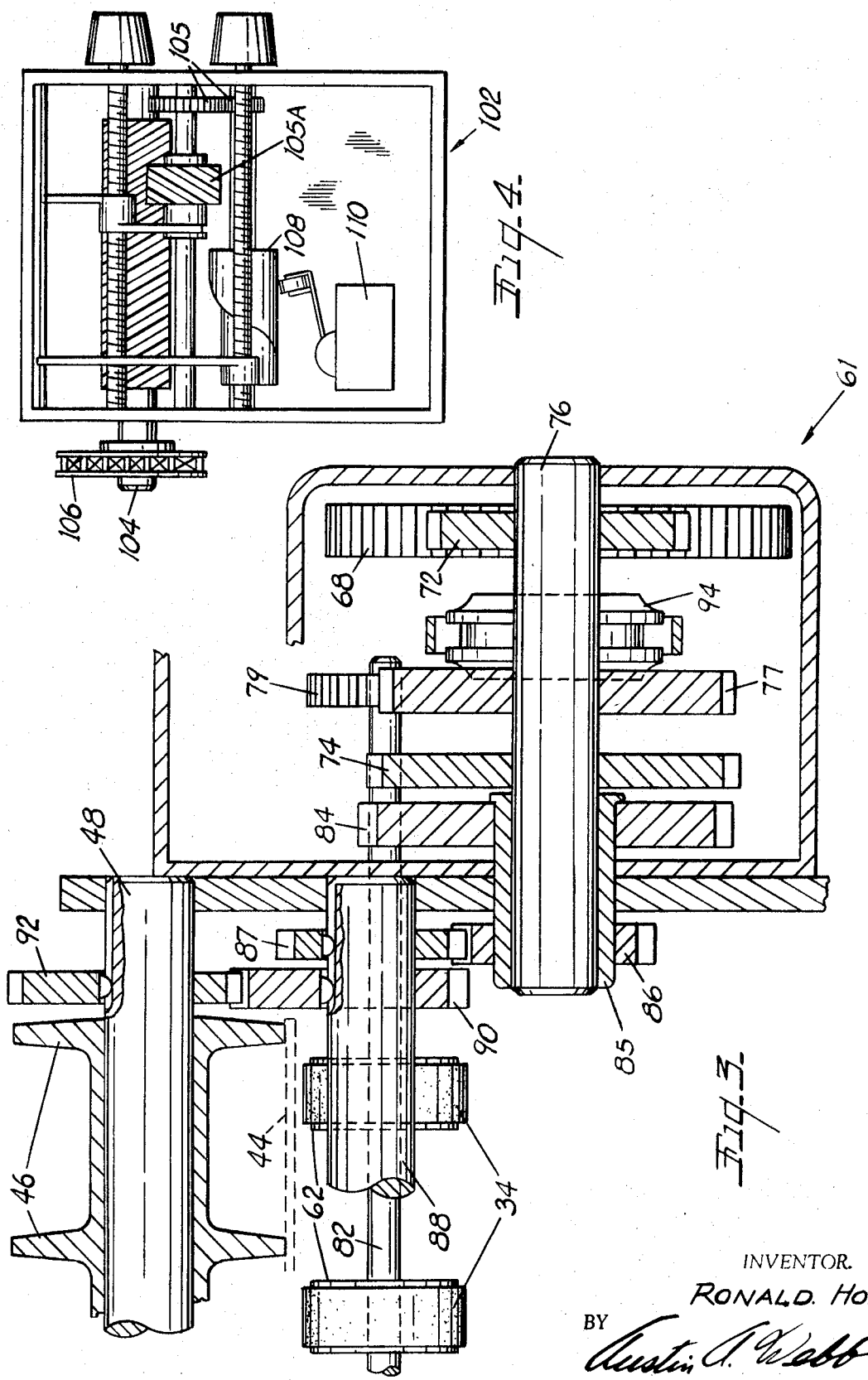

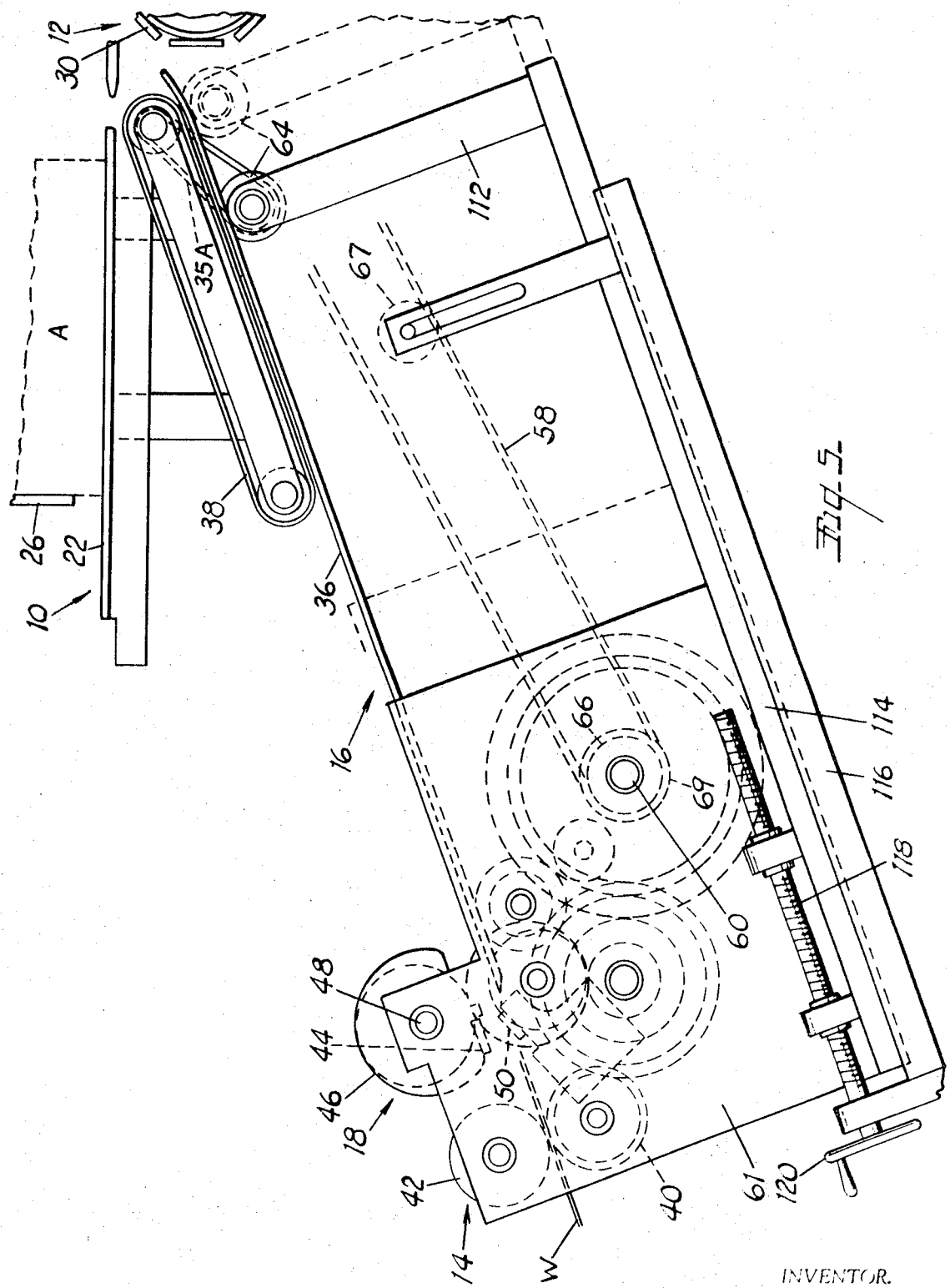

though there are four sheets, illustrate a preferred form of wrapping machine embodying the invention.

FILM FEED AND CUTTER FOR FOLD-OVER WRAPPING MACHINE

DESCRIPTION

The drawings, of which there are four sheets, illustrate a preferred form of wrapping machine embodying the invention.

FIG. 1 is a partially conventionalized side elevational view of the wrapping machine, with supports for the moving parts generally omitted.

FIG. 2 is an enlarged cross sectional view through the gear assembly on the line 2—2 in FIG. 1.

FIG. 3 is an enlarged cross sectional view on the line 3—3 in FIG. 1.

FIG. 4 is a cross sectional view through the change speed control switch.

FIG. 5 is a side elevational view of the machine showing adjustment of the wrapper feed mechanism to wrap larger articles.

The major parts of the machine consist of an article feeding conveyor 10, which delivers to a wrapping conveyor 12. A web of synthetic wrapping film W is fed to the inlet end of the wrapping conveyor by feed rolls 14 and a wrapper feed conveyor 16. At the proper time, the web is cut into individual wrapper sheets by a rotating cutter 18, and the trailing end of the severed sheet is swung or folded forwardly over the article A by a foldover bar 20. The article feeding conveyor consists of a package or article supporting way 22 with a superimposed conveyor 24 having pusher flights 26. The wrapping conveyor 30 includes a conveyor chain 28 with supporting flights 30, and the fold-over bar is advanced around the wrapping conveyor by a chain loop 32.

The wrapper feeding conveyor 16 includes feed belts 34 arranged transversely across the width of the incoming web and operating in slots in a feed table 36. Belts 38 are arranged in adjacent but slightly spaced relation to the upper reaches of belts 34, and are driven at a slightly faster speed than belts 34, by a connecting chain or drive 35 which is driven from the upper rolls 64 of the feed belt assembly. The function of belts 38 is to prevent the rapidly advancing film web from fluttering and becoming tangled on the belts 34. The slight space, about one-eighth of an inch, between the belts 34 and 38 assures that the belts will not restrain the trailing ends of the individual wrappers when the rapidly advancing fold-over bar 20 pulls the end of the newly severed wrapper up and forwardly over the article. The wrapper feed rolls consist of a set of driven rolls 40 and coacting pressure rolls 42. The cutter includes a rotating cutter bar 44 carried by segmental supporting discs 46 on a shaft 48, and coacting with a fixed blade 50. Desirably, the cutter is of the type described more fully in U.S. Pat. No. 3,261,249 to Holt.

The present invention resides in the arrangement and coaction between the driving connections to the several parts of the assembly which permits continuous operation of the article feeding conveyor 10 and the wrapping conveyor 12 at a fixed speed. To this end, the shaft 52 may be considered as a primary device operating directly to drive the pulley 54 which drives the chain 28 of the wrapping conveyor 12. The chain 32 of the fold-over bar is driven at a faster speed by a connection not shown so that the bar 20 picks up the trailing end of the wrapper sheet and carries it forwardly over the advancing article, after the fashion shown in U.S. Pat. No. Re. 26,689. A chain 56 drives the conveyor 24 in equal timed relation to the conveyor 12. A chain 58 acts as a synchronizing drive connection to a shaft 60 of a transmission indicated generally at 61 which drives the feed roll 40, and drive pulleys 62 to the wrapper feed belts and the shaft 48 of the cutter bar. The feed belts operate around upper idler pulleys 64 and lower pulleys 66 which idle on the shaft 60. The chain or belt 58 operates around an adjustable tightener pulley 67 and drives the pulley 69 on shaft 60.

The drives to the feed rolls, cutter and feed belts appear more clearly in FIGS. 2 and 3. The shaft 60 drives a high speed gear 68 and a smaller slow speed gear 70 which coact with and respectively drive gears 72 and 74 on a shaft 76. A gear 77 on shaft 76 drives gears 78 and 79 which respectively drive the web feed rolls 40 on shaft 80 and the wrapper feed drive pulleys 62 on shaft 82. A third gear 83 driven by the shaft 60 drives a gear 84 and sleeve 85 on the shaft 76 to drive the cutter bar. A gear 86 on the sleeve drives gear 87 on shaft 88. Gears 90 and 92 which may be elliptical or eccentric as shown drive cutter shaft 48 to provide a maximum rotational speed of the cutter bar at the time of cutting.

The drive between the shaft 60 and the shaft 76 is variable by means of the shiftable clutch element 94 having jaws 96 and 98 which alternately and selectively connect the gears 68 and 70 to the driven shaft 60. The clutch element is spring biased to engage high speed gear 68 with the drive shaft, but is shiftable by energization of the solenoid 100 to engage the slow speed gear 70, as will be described.

An alternative to the double jaw clutch 94 would be to provide a single disengageable drive connection as by the jaws 96 to the gear 68, and provide an overrunning of the gear 70 on shaft 60. When gear 68 was disconnected from shaft 60 by the clutch, slow speed drive would automatically be taken up by the overrunning clutch.

The solenoid 100 is selectively actuated by variable cam switch 102 which is cyclically driven from the wrapping conveyor 12, as by a shaft 104 driven by a chain 106 from the shaft 52. The chain 106 rotates the shaft 104 once during the advance of each pusher flight bar 26 or during each wrapping cycle. A cam 108 driven by shaft 104 through gears 105 actuates switch 110 to energize the solenoid 100. The cam 108 is axially adjustable along its supporting shaft to have a variable active engagement with switch 110. The position of the gear 105A is axially adjustable to vary the phase angle at which the switch will be actuated in rotational cycle of the shaft 104, and the wrapping cycle of the machine. The switch is a commercially available item and so is not disclosed in greater detail.

OPERATION

The lineal speed of conveyors 10 and 12 determines the operation of the apparatus to make maximum use of the wrapping mechanism. This speed and the size of the package A may vary, but in the example illustrated the shaft 52 makes one revolution per wrapping cycle. The leading edge of the web W is advanced to lie on the conveyor 12 so that when the article A is deposited on the conveyor, the leading edge of the web underlies the middle of the article. The excess of wrapper length fed to the conveyor 12 by the wrapper feed conveyor 16 is picked up and folded over the article by bar 20.

The rotating cutter bar 44 must operate at the same frequency, and to this end chain 58 drives shaft 60 at the same speed as shaft 52. Shaft 60 operates through gears 83 and 84 to drive sleeve 85 and gear 86 at the same ratio of one revolution per cycle, and gears 90 and 92 maintain the same rotational speed of cutter shaft 48. However, the eccentricity of gears 90 and 92 speeds up the peripheral cutting speed of knife somewhat during the cutting operation. The radius of rotation of knife 44 is somewhat less than the radius of the conveyor operating around drive pulley 54, but the increase in speed caused by the eccentric gears compensates for this and desirably adds a slight increment of peripheral speed to the cutter bar, so that the speed of the cutter approximately equals the speed at which the wrapper is taken away by conveyor 12 and so that the infeeding web does not pile up behind the cutter.

The length of web W fed to the cutter and to the wrapper feed conveyor is determined by the web feed rolls 40. In the example illustrated these must rotate between three and four times during each cutting cycle to deliver the desired length of web. The feed rolls 40 and shaft 80 are driven alternatively through gear train 78–77, 72–68 or gear train 78–77, 74–70. Gear 77 drives gear 78 at a ratio of about two and one half to one which multiplied by the 1 to 1 ratio through gears 74 and 70 produces a slow lineal speed approximately equaling the peripheral speed of the cutter bar at the time of the cut. The additional rotation of rolls 40 required to feed the desired length of web during the cutting cycle is obtained by shifting clutch 94 so that the gear 68 drives gear 72 and shaft 76 at a high speed approximately double its slow speed or about five revolutions per cycle.

It will be evident that the length of web fed to the wrapping conveyor can be adjusted by varying the proportion of the wrapping cycle during which clutch 94 is actuated to engage the high speed drive. This is accomplished by adjustment of switch 102 and the position of cam 108 with relation to switch 110.

ADJUSTMENT

It will be evident that if a larger article A having a longer periphery is fed to the wrapping conveyor 12, a longer length of web and wrapper sheet must be fed to the wrapping conveyor. This may be accomplished by adjusting mechanism shown in FIG. 5.

As is shown in FIG. 5, the wrapper feed conveyor 16 including the support 112 for the upper ends of feed belts 34 and the transmission 61 are mounted on a base 114. The base is slidable on an inclined fixed slideway 116. An adjusting screw 118 operated by a handwheel 120 acts to locate the base on the slideway. By dropping the base down on the slideway as shown in full lines, the length of the wrapper feed conveyor, and the distance of the wrapping conveyor 12 from the cutter 18 is increased to accommodate a longer wrapper sheet. The supporting table 36 has extensible sections (not shown) to accommodate the increased length. The increased length of web and wrapper sheet fed into the machine is obtained by adjusting the switch 102 so that solenoid 100 and clutch 94 are actuated during a longer portion of the wrapping cycle. This holds the high speed drive in operation for a longer time to increase the amount of wrapper feed. When the wrapper feed conveyor 16 is adjusted to deliver the longer wrapper, a longer belt 35A or other drive adjustment must be made to continue the drive to the web retaining and guiding belts 38.

The belts 38 being driven from the belts 36, preferably at a slightly faster speed, operate at the slow and fast feed rates as the transmission is shifted between its two drive ratios. Note that both sets of belts will operate at the slower speed as the cutter 44 is operating, and that this will occur at about the time at which the leading end of the web and wrapper reaches the wrapping conveyor 12.

What is claimed as new is:

1. In combination with a wrapping machine having an article feeding conveyor delivering to a wrapping conveyor, web feeding rolls delivering to a rotary cutter and web advancing means delivering past said cutter to said wrapping conveyor, synchronizing drive connections comprising:

a main drive connected to drive said conveyors at about the same peripheral speed and having a cycle corresponding to the wrapping cycle of the wrapping conveyor, a second drive driven from said first drive and connected to drive said cutter at one revolution per cycle of the main drive, a third drive driven from said first drive and connected to drive said feed rolls and said web advancing means, said third drive including alternately operable gear trains providing high and low speed drives, electrically actuated means arranged to engage said high speed drive, and a switch driven cyclically with said main drive and arranged to actuate said electrically actuated means during a fractional part of the cycle of said main drive.

2. The combination as defined in claim 1 in which said second drive is arranged to drive the cutter so that the peripheral speed of the cutter is slightly greater than the lineal speed of said conveyors.

3. The combination as defined in claim 2 in which said second drive includes mating eccentric gears arranged to accelerate the speed of said cutter at its time of cutting.

4. The combination as defined in claim 2 in which the slow speed drive to said feed rolls drives the rolls at about the same peripheral speed as the peripheral speed of said cutter at the time of cutting.

5. The combination as defined in claim 1 in which said switch is adjustable to vary the fraction of the wrapping cycle during which said electrically actuated means is operative to engage said high speed drive.

6. The combination as defined in claim 5 in which said switch is further adjustable to close at different points in the cycle of the wrapping conveyor.

7. The combination as defined in claim 1 in which said feed rolls, said cutter and said web advancing means are adjustably supported and movable toward and away from the inlet end of said wrapping conveyor to vary the distance between the cutter and the wrapping conveyor.

8. The combination as defined in claim 5 in which said feed rolls, said cutter and said web advancing means are adjustably supported and movable toward and away from the inlet end of said wrapping conveyor to vary the distance between the cutter and the wrapping conveyor.

9. The combination as defined in claim 1 in which
   said web advancing means comprises wrapper feed belts of the same general length as the length of the wrapper,
   and wrapper retaining belts positioned over said wrapper feed belts and having lower reaches advanced in slightly spaced relation to the wrapper feed belts.

10. The combination as defined in claim 9 in which said retaining belts are connected to be driven from said third drive means at a slightly greater speed than said web feed belts.

* * * * *